(12) United States Patent
Tabata et al.

(10) Patent No.: US 6,560,025 B2
(45) Date of Patent: May 6, 2003

(54) TRANSLUCENT SCREEN

(75) Inventors: Seiichiro Tabata, Hino (JP); Tetsuhide Takeyama, Hachioji (JP)

(73) Assignee: Olympus Optical Co., Ltd. (JP)

( * ) Notice: Subject to any disclaimer, the term of this patent is extended or adjusted under 35 U.S.C. 154(b) by 65 days.

(21) Appl. No.: 09/812,183

(22) Filed: Mar. 19, 2001

(65) Prior Publication Data

US 2001/0024328 A1 Sep. 27, 2001

(30) Foreign Application Priority Data

Mar. 27, 2000 (JP) ........................................ 2000-086994

(51) Int. Cl.$^7$ ................................................. G02B 27/10
(52) U.S. Cl. ........................................ 359/624; 359/626
(58) Field of Search ................................. 359/619, 624, 359/626

(56) References Cited

U.S. PATENT DOCUMENTS

| | | | | |
|---|---|---|---|---|
| 3,877,802 A | * | 4/1975 | Greenspan | 353/77 |
| 4,443,814 A | | 4/1984 | Mori et al. | 358/60 |
| 5,563,738 A | | 10/1996 | Vance | 359/614 |
| 5,781,344 A | | 7/1998 | Vance | 359/614 |
| 6,195,213 B1 | * | 2/2001 | Omura et al. | 359/727 |
| 6,396,639 B1 | * | 5/2002 | Togino et al. | 359/630 |

FOREIGN PATENT DOCUMENTS

| | | |
|---|---|---|
| JP | 05-273655 | 10/1993 |
| JP | 10-090797 | 4/1998 |
| WO | WO 95/06888 | 3/1995 |

* cited by examiner

*Primary Examiner*—Ricky Mack
*Assistant Examiner*—Brandi N Thomas
(74) *Attorney, Agent, or Firm*—Straub & Pokotylo; John C. Pokotylo

(57) ABSTRACT

The present invention is a translucent screen comprising a plurality of spherical lenses arranged in an orthohexagonal lattice structure or a tetragonal lattice structure on a two-dimensional plane, a supporting member disposed at the incident side of the spherical lenses, a diffusion plate which is disposed at the emission side of the spherical lenses where the surface at the side facing the spherical lenses is the diffusion surface, and a shield which connects the spherical lenses, defines the entrance aperture at the incident side and functions as a black matrix at the emission side, wherein the luminous flux entering diagonally is converted to the luminous flux which center is a direction approximately vertical to the main surface of the translucent screen, and are emitted.

6 Claims, 17 Drawing Sheets

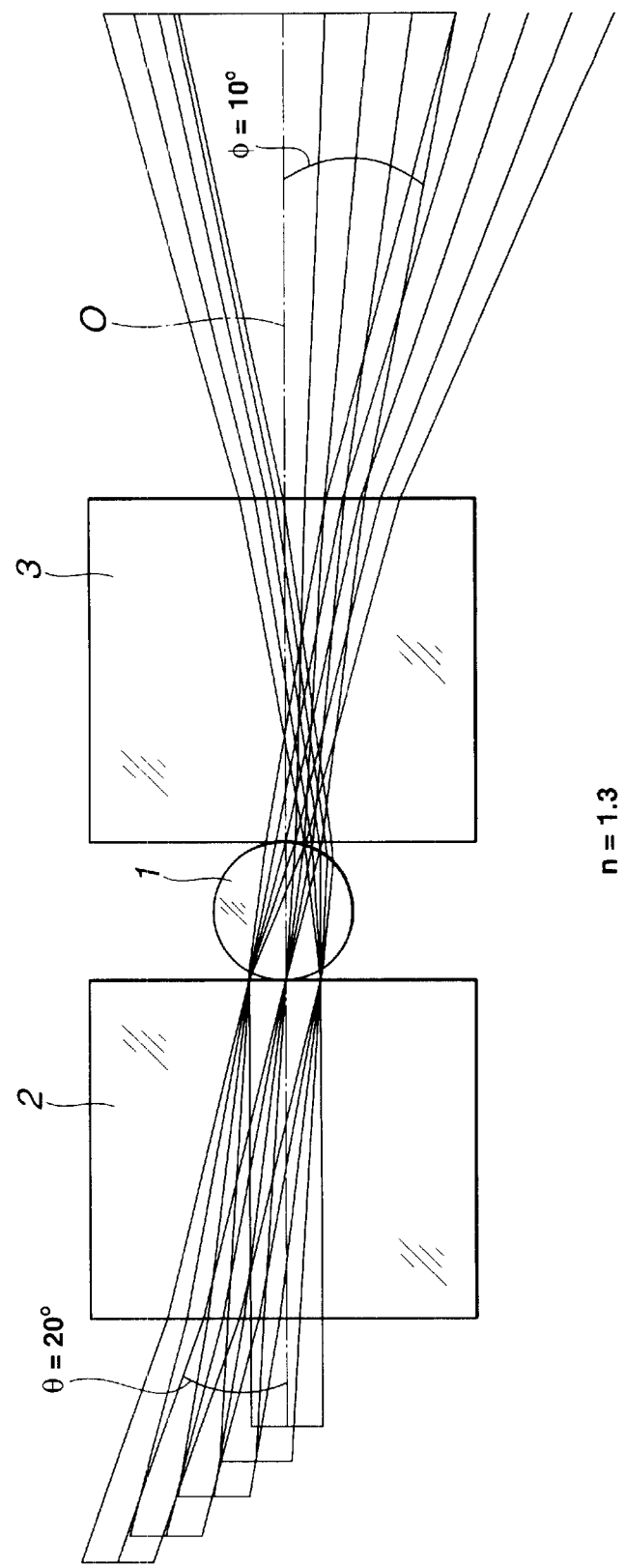

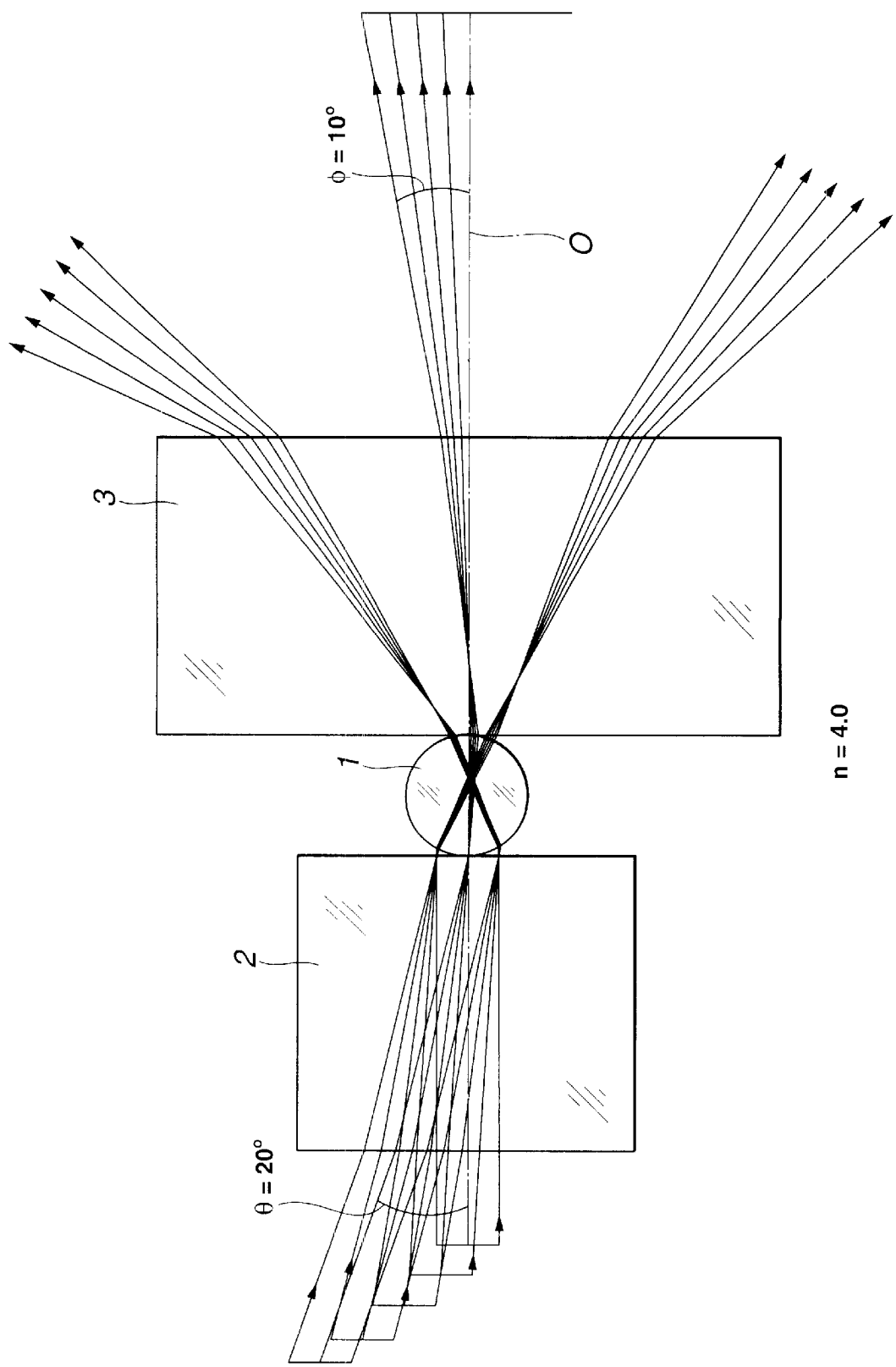

IDEAL STATE WHEN n = 1.3

TRANSLUCENT SCREEN

This application claims benefit of Japanese Application No.2000-086994 filed in Japan on Mar. 27, 2000, the contents of which are incorporated by this reference.

BACKGROUND OF THE INVENTION

1. Field of the Invention

The present invention relates to a translucent screen, and more particularly to a translucent screen which can display a projected image so as to be observed.

2. Description of the Related Art

Various configurations have been proposed for translucent screens used in equipment where images are projected onto a translucent screen by a projector so that images can be observed.

In the case of a translucent screen stated in Japanese Patent Application Laid-Open No. 10-90797, for example, in order to improve the drop of the peripheral light quantity by light entering at an angle onto the peripheral area of the screen in a rear projection type projector, which screens are becoming progressively larger and slimmer, many beads, which are spherical optical materials, are arranged on the main surface of the transparent substrate at the projector side, and the luminous flux emitting side of the beads, which is the transparent substrate side, is retained by the beads retaining layer, and a concentric type optical layer is created at the luminous flux incident side, which is closer to the projector than the beads, and the luminous flux entering diagonally is deflected so that the light enters the beads approximately vertically.

Japanese Patent Application Laid-Open No. 5-273655 describes a technology to decrease the reflection of extraneous light by creating a colored layer which absorbs light having a predetermined wavelength range in the translucent screen where many beads are arranged on a plane.

Also U.S. Pat. No. 5,563,738 and U.S. Pat. No. 5,781,344 describes a technology to arrange many beads on the main surface at the projector side of the transparent substrate, retaining the luminous flux emission side of the beads with a bonding layer, and creating a new resin layer at the luminous flux incident side, which is at the projector side of the beads, so that an effective radius of the curvature at the rear side of the beads is increased and the reflection of extraneous light is decreased.

On the other hand, to implement a multi-screen, a technology to project images of a plurality of arranged projectors onto a translucent screen has been proposed. The images to be projected by the plurality of projectors may be independent and different from each other, but it is also possible to display a large image on the entire screen by projecting a divided part of one image by each projector.

To implement such a multi-screen, a plurality of projectors P1, P2, P3 . . . are arranged so as to project images on the translucent screen 91 having a diffusion surface, which is observed.

The above projector comprises, for example, a translucent LCD which displays images, an illuminating system which illuminates this LCD from the rear face, and an optical system which projects the images of the illuminated LCD onto the above translucent screen, and the projected luminous flux is illuminated and spread in a fan shape from the optical system onto the translucent screen.

In the above mentioned configuration, generally smooth and continuous images can be observed when the projected images are observed from the right front of the screen, but if the projected images are observed from a diagonal direction, the connecting sections of the images which are projected by different projectors are observed with discontinuous brightness, as shown in FIG. 23.

In other words, as FIG. 22 shows, the luminous flux transmitted through the screen 91 is diffused on the diffusion surface, and at this time, the intensity of light which is diffused in the direction the same as the incident light is the strongest, and intensity gradually decreases as the angle of the diffused light recedes from this direction.

Therefore in FIG. 21, the beam R1 projected from the projector P2 is emitted at a relatively high intensity after transmitting the screen 91 as a beam R1', which is almost the same direction as the beam R1. If the beam R2 projected from the projector P1 is observed from the direction of beam R1', however, the intensity of beam R2', which is the same direction as the beam R1' after diffusion, drops, so as FIG. 23 shows, the connecting sections of the images 91a by each projector are observed as discontinuous, where the section contributed by beam R1' has high brightness and the section contributed by beam R2' has low brightness.

SUMMARY OF THE INVENTION

It is an object of the present invention to provide a translucent screen where smooth continuous images can be observed even from a diagonal direction.

The present invention is a translucent screen used for a projector system which creates a multi-screen by projecting respective images from a plurality of arranged projectors, comprising a first surface where a plurality of condensing optical surfaces for condensing entering luminous flux are arranged at a predetermined cycle, and a second surface where a plurality of optical surfaces for deflecting the optical paths of lights entering approximately the center of the condensing optical surfaces arranged on the first surface to the direction approximately vertical to the main surface of the translucent screen are arranged at a predetermined cycle, wherein the above mentioned first surface and the second surface are set such that when the same images are projected from two adjacent projectors out of the above mentioned plurality of projectors, the beams from the two adjacent projectors emitted from the second surface are set such that brightness is the same regardless the direction of observing the translucent screen, and that the images constituting the multi-screen continue smoothly.

The objects and advantages of the present invention will become further apparent from the following detailed explanation.

BRIEF DESCRIPTION OF THE DRAWINGS

FIG. 2 is a diagram depicting the state of emitting lights when the refractive index is n=1.3 and the incident angle is θ=20 in the first embodiment;

FIG. 3 is a diagram depicting the state of emitting lights when the refractive index is n=4.0, and the incident angle is θ=20 in the first embodiment;

DESCRIPTION OF THE PREFERRED EMBODIMENTS

Embodiments of the present invention will now be described with reference to the accompanying drawings.

Figure 1A:
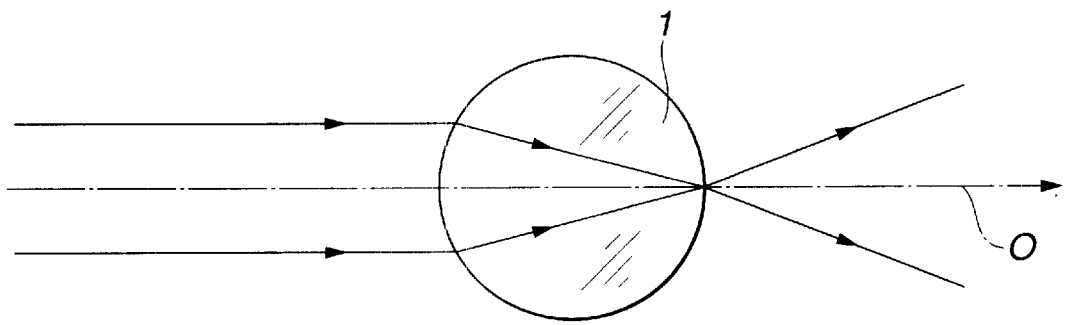
FIG. 1A, FIG. 1B and FIG. 1C are diagrams depicting the principle when luminous flux which enters diagonally is emitted in a direction vertical to the main surface of the screen at the center in the first embodiment of the present invention.
Figure 1B:
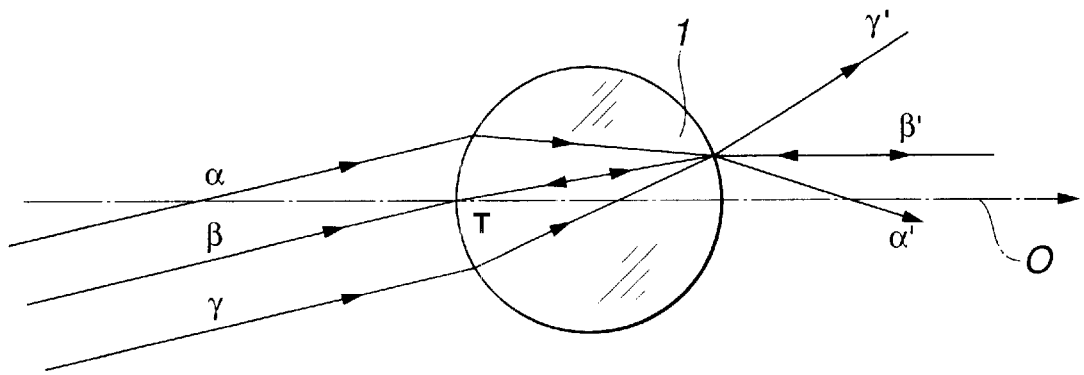
Figure 1C:
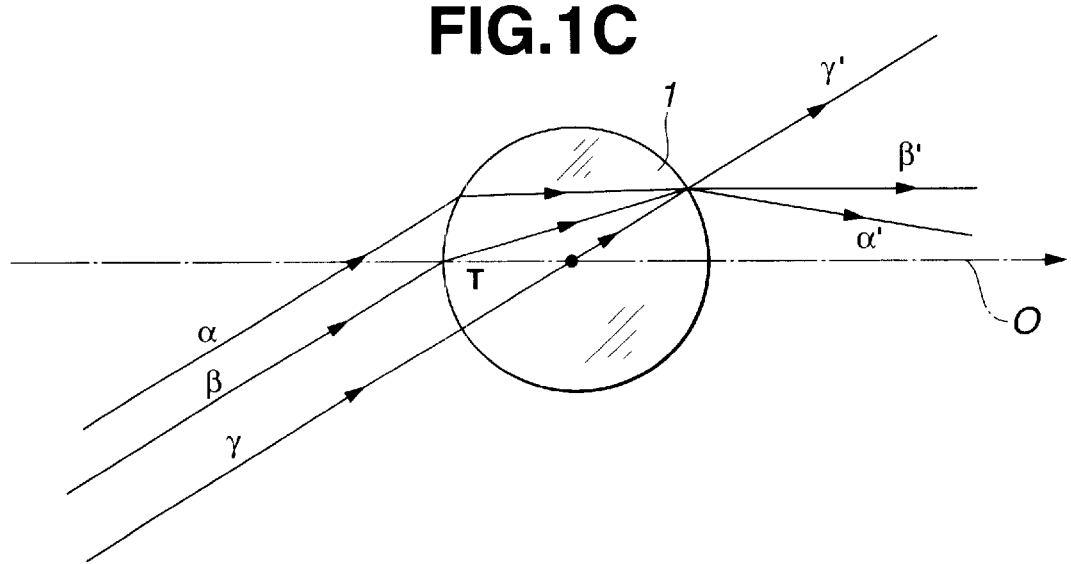

FIG. 1A to FIG. 11 show the first embodiment of the present invention, where FIG. 1A, FIG. 1B and FIG. 1C are diagrams depicting the principle when the luminous flux which enters diagonally is emitted in a direction vertical to the main surface of the screen at the center.

First, the principle will be described with reference to FIG. 1A, FIG. 1B and FIG. 1C.

When beams parallel to the optical axis O which passes through the center of the spherical lens 1 with the radius r, which is comprised of optical material having a refractive index to be focal distance f=2r, enters the spherical lens 1, as shown in FIG. 1A, the beams focus on the opposite surface crossing the optical axis O, then are emitted outside.

FIG. 1B shows beams which diagonally enter the entrance aperture shown in FIG. 1A of such an optical system.

In other words, the luminous flux from the incident light a to the incident light γ enters the spherical lens 1 from the entrance aperture, and the beam β which passes through the center of the entrance aperture, that is, the point T where the optical axis O and the surface of the spherical lens 1 cross, is emitted as the beam β', which is in parallel with the optical axis O.

This can be understood by following the optical path of beam β' (β) in reverse. In other words, the spherical lens 1 is symmetrical at the incoming side and outgoing side with respect to the optical axis O, so if the optical path of the beam β' (β) is reversed horizontally, a beam in parallel with the optical axis O enters and is emitted from the point T where the optical axis O and the surface cross, just like the case of FIG. 1A.

In other words, a beam which enters the point T, whether the beam enters vertically or diagonally, is emitted as a beam in parallel with the optical axis O when it is emitted from the spherical lens 1. However, the distance from the optical axis O differs depending on the incident angle.

The beam α is deflected in the direction opposite from the incident angle, and is emitted as the beam α', and the beam γ is emitted as the beam γ' at the emitting angle which is greater than the incident angle, but since the angle formed by the beam γ' and the beam γ' is greater than the angle formed by the beam β' and the beam α', the luminous flux between the beam β' and the beam α' is dense and has high intensity, while the luminous flux between the beam β' and the beam γ' is more coarse than this, and has low intensity.

In this way, the emitting luminous flux is emitted as a diffused light with the beam β' approximately at the center where density is higher in the beams which are more parallel to the optical axis O.

Also when the incident angle is larger, the beam β which passes through the point T is emitted as the beam β' which is in parallel with the optical axis O, as FIG. 1C shows, and the diffused light from the beam α' to the beam γ' is emitted with the beam β' at the center.

Figure 22:
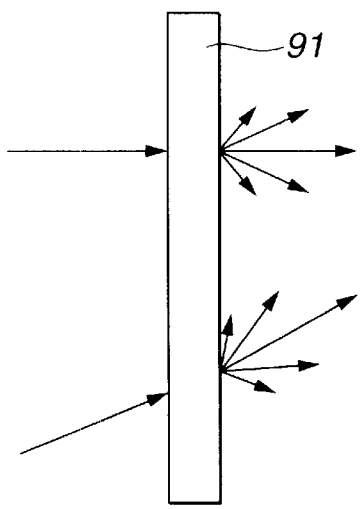
FIG. 22 is a diagram depicting the state of the change of light intensity depending on the direction when the lights entering the translucent screen of the related art are diffused and emitted.
Figure 23:
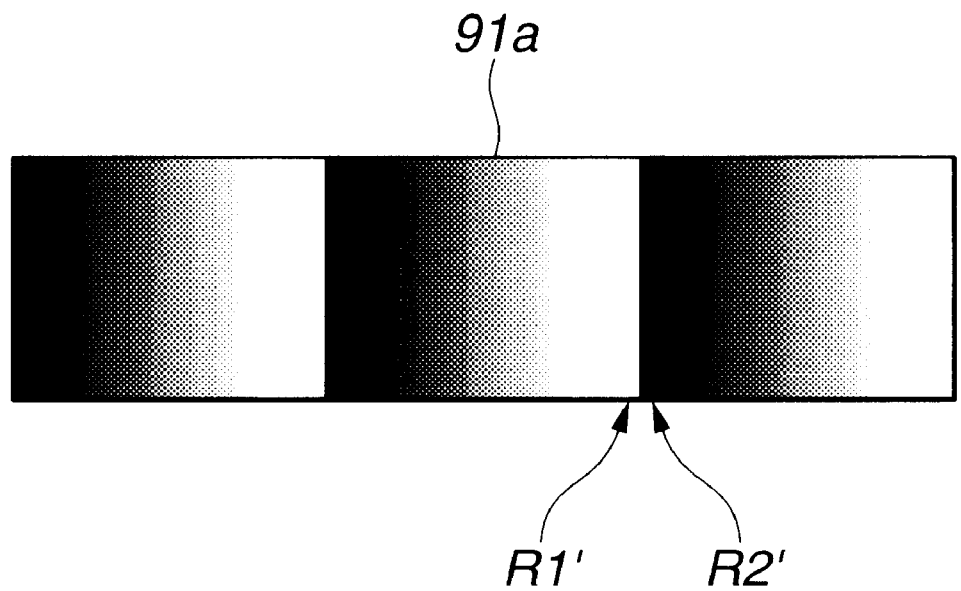
FIG. 23 is a diagram depicting the state when the images projected from a plurality of projectors onto the translucent screen of the related art are observed from a diagonal direction.

As mentioned later, this light is diffused more on the diffusion surface, where the diffused light is as shown in FIG. 22, since the light entering the diffusion surface is a beam approximately vertical to the main surface of the diffusion surface, therefore even if the translucent screen is observed from a diagonal direction, a discontinuous screen, as shown in FIG. 23, is not observed.

When the refractive index of the optical medium constituting the spherical lens 1 is n, the focal distance f of the image-space of the paraxial ray which enters from an infinity point to the spherical lens 1 with radius r is given by the following formula 1 since the refractive index of air is approximately 1.

$$f = nr/(n-1) \quad \text{[Formula 1]}$$

The lights focus on the surface of the spherical lens 1 when the focal distance f is 2r, as mentioned above, so if f=2r is substituted in the formula 1, then n=2, which means that the focal distance f does not depend on the radius r.

Therefore, diffused light with a beam in parallel with the optical axis as a center, as shown in FIG. 1A, FIG. 1B and FIG. 1C, can be obtained by setting the refractive index n to a value around 2 (the practical optimum value will be described later), regardless the size of the spherical lens 1.

Figure 4:
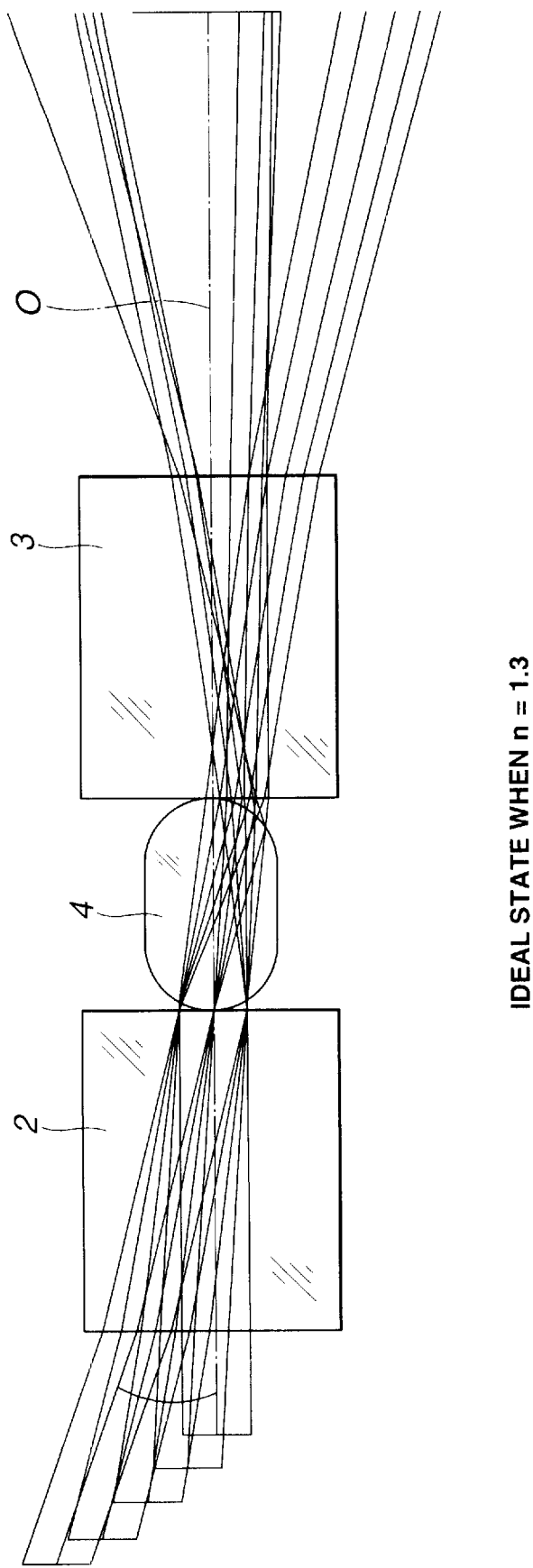
FIG. 4 is a diagram depicting the state when the lens shape is changed so as to obtain the ideal emitting light at refractive index n=1.3 in the first embodiment.

FIG. 2 to FIG. 4 show the states of emitting light when the refractive index n of the spherical lens 1 is changed.

FIG. 2 is a diagram depicting the emitting light when the refractive index is n=1.3 and the incident angle is θ=20.

The spherical lens 1 is modeled so as to be supported by being sandwiched by light transmitting supporting member 2 and 3, which are flat at the incident side and the emitting side.

As FIG. 2 shows, when the refractive index is n=1.3, light is emitted at the emitting angle φ=10, which is half of the incident angle θ=20, therefore an effect is observed even if the refractive index is about n=1.3.

FIG. 3 is a diagram depicting the state of emitting light when the refractive index is n=4.0 and the incident angle is θ=20.

When the refractive index is n=4.0 in this way, light is emitted at the emitting angle φ=10, just like the case of refractive index n=1.3 shown in FIG. 2, which is half the incident angle θ=20, therefore the diffusion of beams is wider than the case of the refractive index n=1.3, but an effect is still observed even if the refractive index is about n=4.0.

FIG. 4 is a diagram depicting the state when the lens shape is changed so as to obtain an ideal emitting light with the refractive index n=1.3.

As described above, the refractive index is about n=2 when the ideal emitting light is obtained using the spherical lens 1, where the focal point is near the surface of the emission side. Therefore, in order to obtain an ideal emitting light, positioning the focal point near the surface of the emission side at about the refractive index n=1.3, the length of the lens is increased so that the same optical path length can be insured.

The lens 4 has spherical surfaces at the incident side and the emission side, and is created to be long in the direction of the optical axis O. If a lens 4 like this is used, the light which passes through the center of the entrance aperture is emitted approximately in parallel with the optical axis O.

Figure 5:
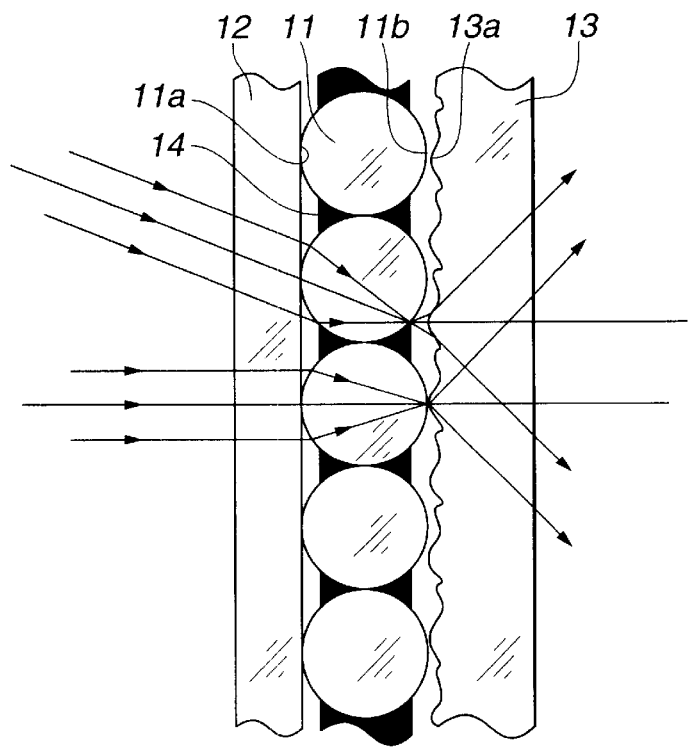
FIG. 5 is a diagram depicting an example of the translucent screen comprised of the spherical lenses in the first embodiment.
Figure 7A:
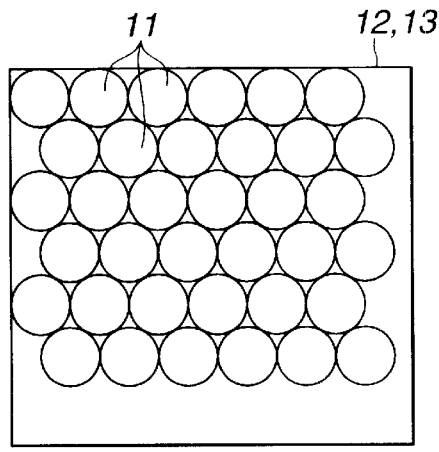
FIG. 7A and FIG. 7B are plan views depicting arrangement examples of the spherical lenses in the translucent screen of the first embodiment.
Figure 7B:
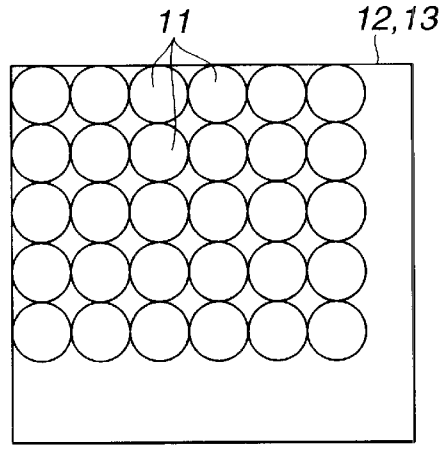

FIG. 5 is a diagram depicting an example of the translucent screen comprised of spherical lenses based on the above mentioned principle, and FIG. 7A and FIG. 7B are plan views depicting arrangement examples of the spherical lenses in the translucent screen.

This translucent screen is comprised of a plurality of spherical lenses 11 arranged two-dimensionally, which are sandwiched by the supporting material 12 at the incident side and the diffusion plate 13 at the emission side.

The above spherical lens 11 is sufficiently smaller than the pixel size of the images projected onto this translucent screen by the projector.

These spherical lenses 11 are arranged in an orthohexagonal lattice structure, as shown in FIG. 7A, or tetragonal lattice structure, as shown in FIG. 7B, in a plane in parallel with the main surface of the translucent screen, and light shield 14, which is light shielding means, made of light shielding material, is disposed from the incident side to the emission side of the spherical lenses 11, so as to connect the spherical lenses 11.

The above mentioned diffusion plate 13 is configured such that the surface facing the spherical lenses 11 is the diffusion surface 13a which is comprised of a sand face, a fine-grain face, or something similar, and the diffused luminous flux, which is emitted from the spherical lenses 11 with the approximate vertical direction at the center, is diffused even more so that images can be observed from wide viewing angles.

It is preferable that this diffusion surface 13a is arranged to be the surface closest to the focal point position of the spherical lenses 11, as illustrated. By arranging the diffusion surface 13a to be near the focal point position, an out of focus image due to the diffusion surface 13a itself can be prevented, and a light diffusion effect by this diffusion surface 13a can be utilized so that this image is not darkened even if the image on the translucent screen is observed from a diagonal direction.

Such an arrangement of the diffusion surface 13a is more advantageous as the screen area of the translucent screen increases. In other words, in the case of a large translucent screen, the thickness of the supporting material 12 and the diffusion plate 13 must be increased to insure the strength of the screen. If the diffusion surface 13a is arranged to be a surface face at the emission side of the diffusion plate 13, the diffusion surface 13a is optically distant from the focal point position, and an out of focus image cannot be ignored.

The above supporting material 12 and the diffusion plate 13 are made of transparent optical materials, such as glass and plastic.

The above shield 14 functions to define the entrance aperture at the incident side of the spherical lens 11, by which the first convex lens surface 11a, which is a condensing optical surface to be the entrance aperture of the spherical lens 11, is defined. The first convex lens surface 11a to be the condensing optical surface exists for the number of the arranged spherical lenses, and the first surface is comprised of an aggregate of these first convex lens surfaces 11a.

The part to be the emission side of the shield 14 has the function of a black matrix which suppresses the reflection of extraneous light which enters from the outside, and the second convex lens surface 11b, which constitutes the second surface of the spherical lenses 11, is defined by this part.

Figure 6:
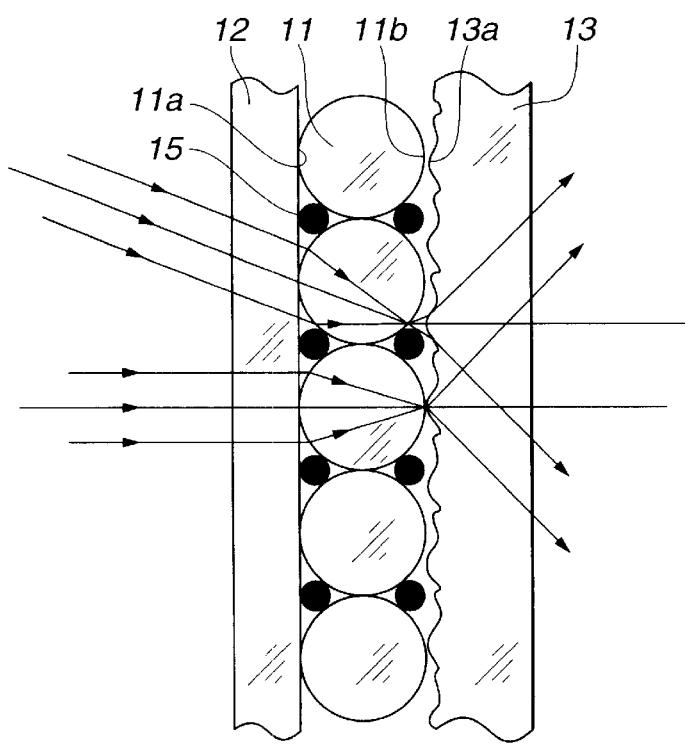
FIG. 6 is a diagram depicting a variant form of the translucent screen comprised of the spherical lenses in the first embodiment.

FIG. 6 is a diagram depicting a variant form of the translucent screen comprised of spherical lenses based on the above mentioned principle.

In other words, in this translucent screen, the shielding means, which shields the incident side and the emission side of the spherical lenses 11, are black beads for shielding 15, which size is smaller than the spherical lenses, instead of the above mentioned shield 14.

The black beads for shielding 15 are created in sizes so that the black beads enter the space between the spherical lenses 11 and the supporting material 12, and just like the above mentioned shield 14, the black beads for shielding 15, disposed at the incident side of the spherical lenses 11, has a function to define the entrance aperture, and the black beads for shielding 15, disposed at the emission side, has a function of a black matrix to suppress the reflection of the extraneous light which enters from the outside.

The black beads for shielding 15 may be created by a melting type material, so that a similar configuration as shown in FIG. 5 is implemented by heating and melting the black beads after arranging them at predetermined positions between the spherical lenses 11. In this case, the black beads also function to secure the spherical lenses 11.

Now, the state when the beam transmits through the translucent screen, configured as shown in FIG. 5 or FIG. 6, will be described with reference to FIG. 8 to FIG. 11.

The spherical lens 11 is created here to have a refractive index of n=1.84 and a diameter of 1 mm. As FIG. 1A, FIG. 1B and FIG. 1C show, the lights emitted from the spherical lens when the incident light is diagonal are luminous flux with a light in parallel with the optical axis O (central light) at the center, but distribution thereof is not symmetrical with respect to the central light. So the above mentioned refractive index n=2 is adjusted to be n=1.84 so that an optimum image can be obtained after the above lights are diffused on the diffusion surface 13a of the diffusion plate 13.

To use spherical lenses in this way, a refractive index of around $1.8 \leq n \leq 2.0$ is most desirable, but an incident angle correction effect can still be observed, as mentioned above, with a refractive index of around $1.3 \leq n \leq 4.0$.

Figure 8:
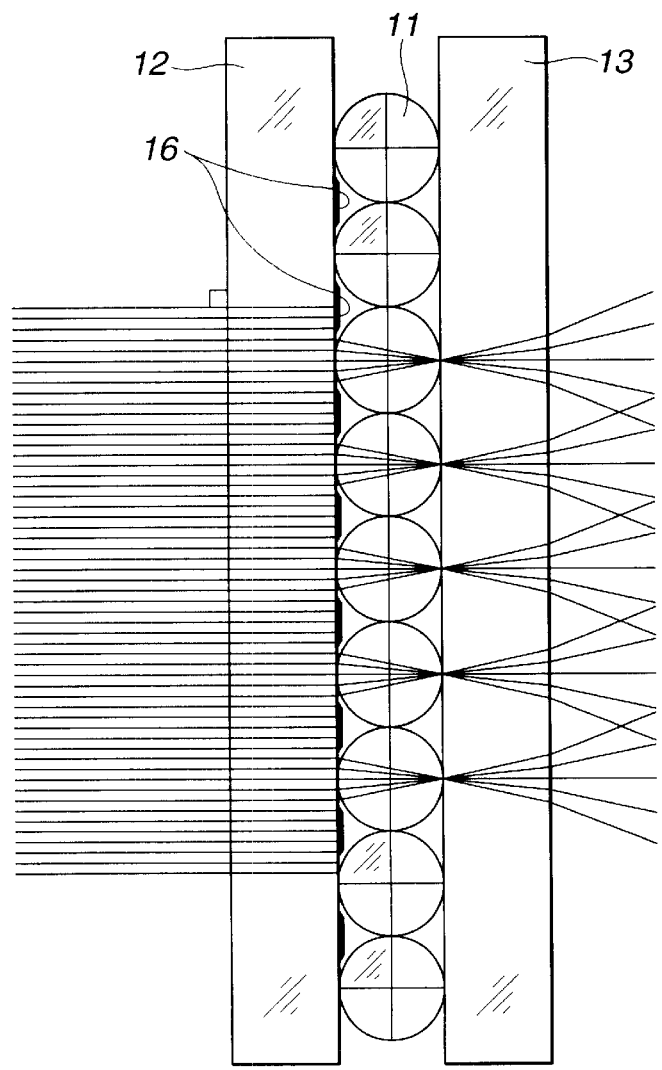
FIG. 8 is a diagram depicting the state of emitting lights when the luminous flux at incident angle θ=0 enters the spherical lenses which refractive index is n=1.84 in the first embodiment.

FIG. 8 is a diagram depicting the state of emitting lights when luminous flux at incident angle $\theta=0$ enters the spherical lenses which refractive index is n=1.84.

The parts denoted by 16 in FIG. 8 show the range where light is shielded by the above mentioned shield 14 or the black beads for shielding 15.

The beams which enter vertically onto the main surface of the translucent screen, that is at the incident angle 0°, focus near the surface at the emission side of the spherical lenses 11, and then are emitted slightly diffused. In FIG. 8 to FIG. 11, the diffusion effect by the diffusion surface 13a of the diffusion plate 13 is not included, in order to clarify the optical path of emitting lights.

In other words, the luminous flux which enters vertically onto the translucent screen is emitted as luminous flux with a direction approximately vertical to the main screen of the translucent screen at the center.

Figure 9:
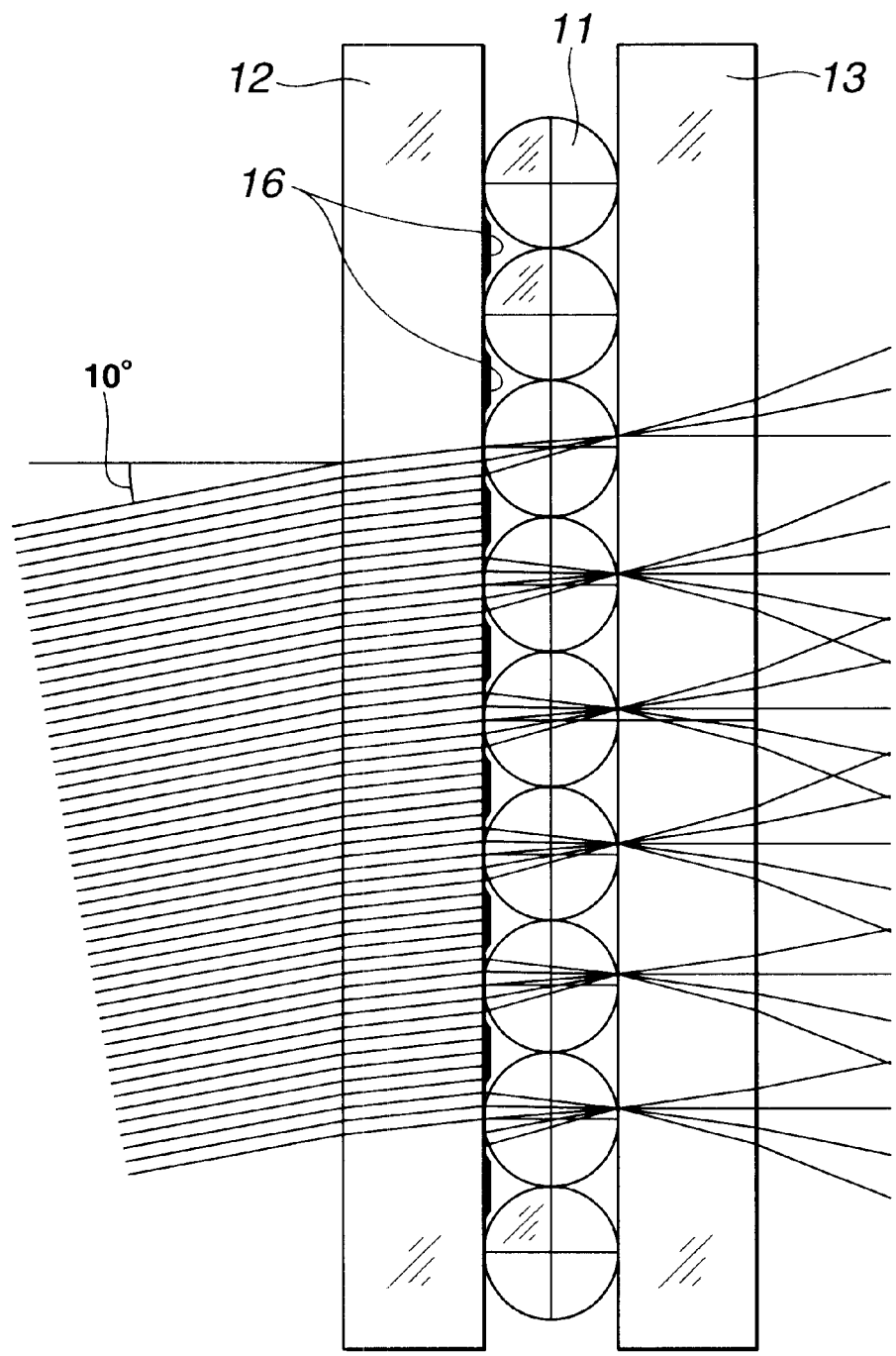
FIG. 9 is a diagram depicting the state of emitting lights when the luminous flux at incident angle θ=10 enters the spherical lenses which refractive index is n=1.84 in the first embodiment.

FIG. 9 is a diagram depicting the state of emitting lights when luminous flux at incident angle $\theta=10$ enters the spherical lenses which refractive index is n=1.84.

The beams which enter at incident angle 10 slightly deflect at the boundary of air and the supporting material 12, but the beams deflect again when the beams are emitted onto the air layer between the supporting material 12 and the spherical lenses 11, so the beams enter the spherical lenses 11 at the incident angle 10 after all.

The lights entering the spherical lenses 11 focus near the surface of the emission side of the spherical lenses 11, then are emitted, transmitting through the diffusion plate 13.

In this way, the luminous flux emitted from the diffusion plate 13 becomes luminous flux which diffuses with a direction approximately vertical to the main surface of the translucent screen at the center.

Figure 10:
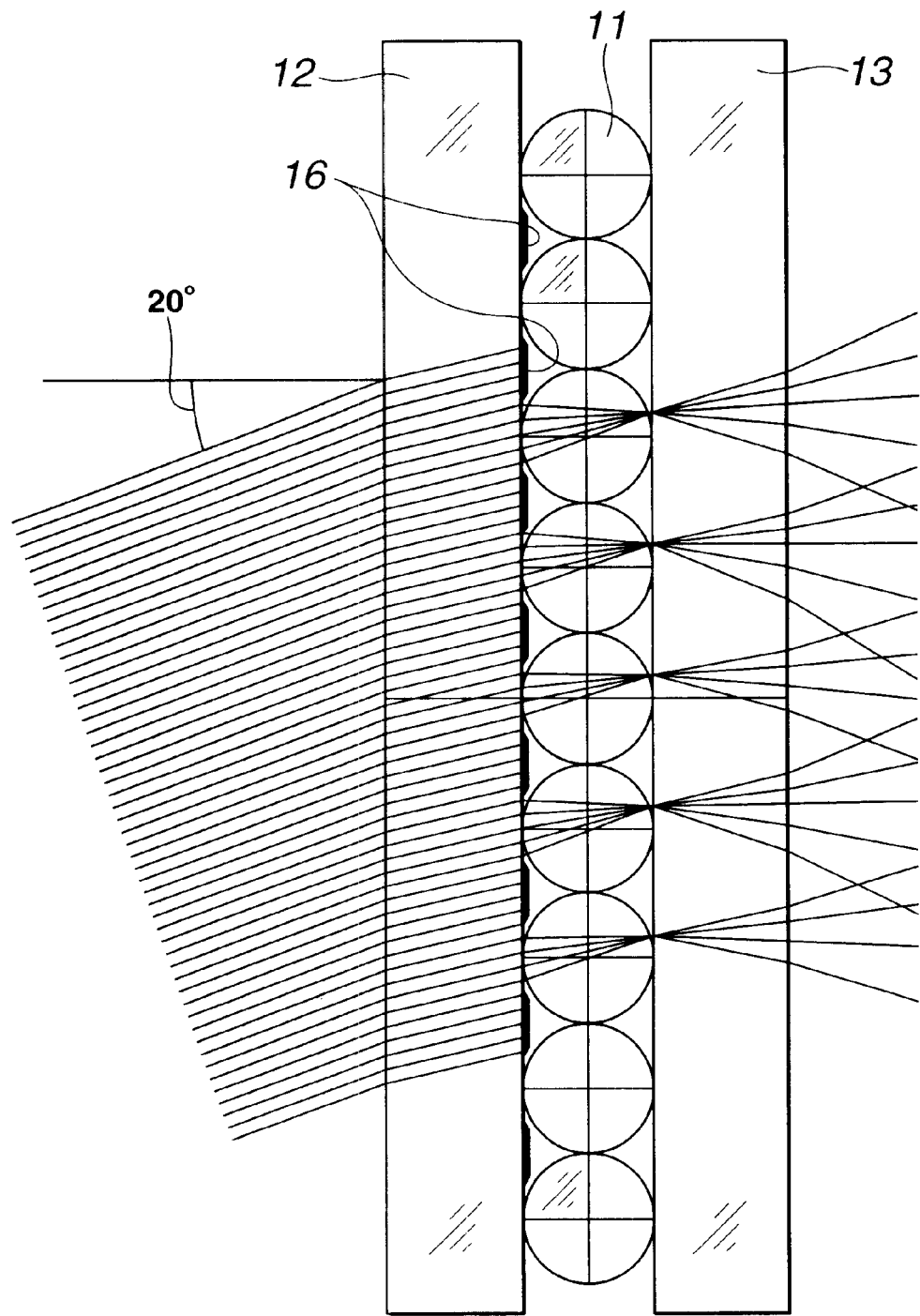
FIG. 10 is a diagram depicting the state of emitting lights when the luminous flux at incident angle θ=20 enters the spherical lenses which refractive index is n=1.84 in the first embodiment.

FIG. 10 is a diagram depicting the state of emitting lights when luminous flux at incident angle $\theta=20$ enters the spherical lenses which refractive index is n=1.84.

In the same configuration as FIG. 9, luminous flux which diffuses with a direction approximately vertical to the main surface of the translucent screen at the center is emitted even when the incident angle is $\theta=20$.

Figure 11:
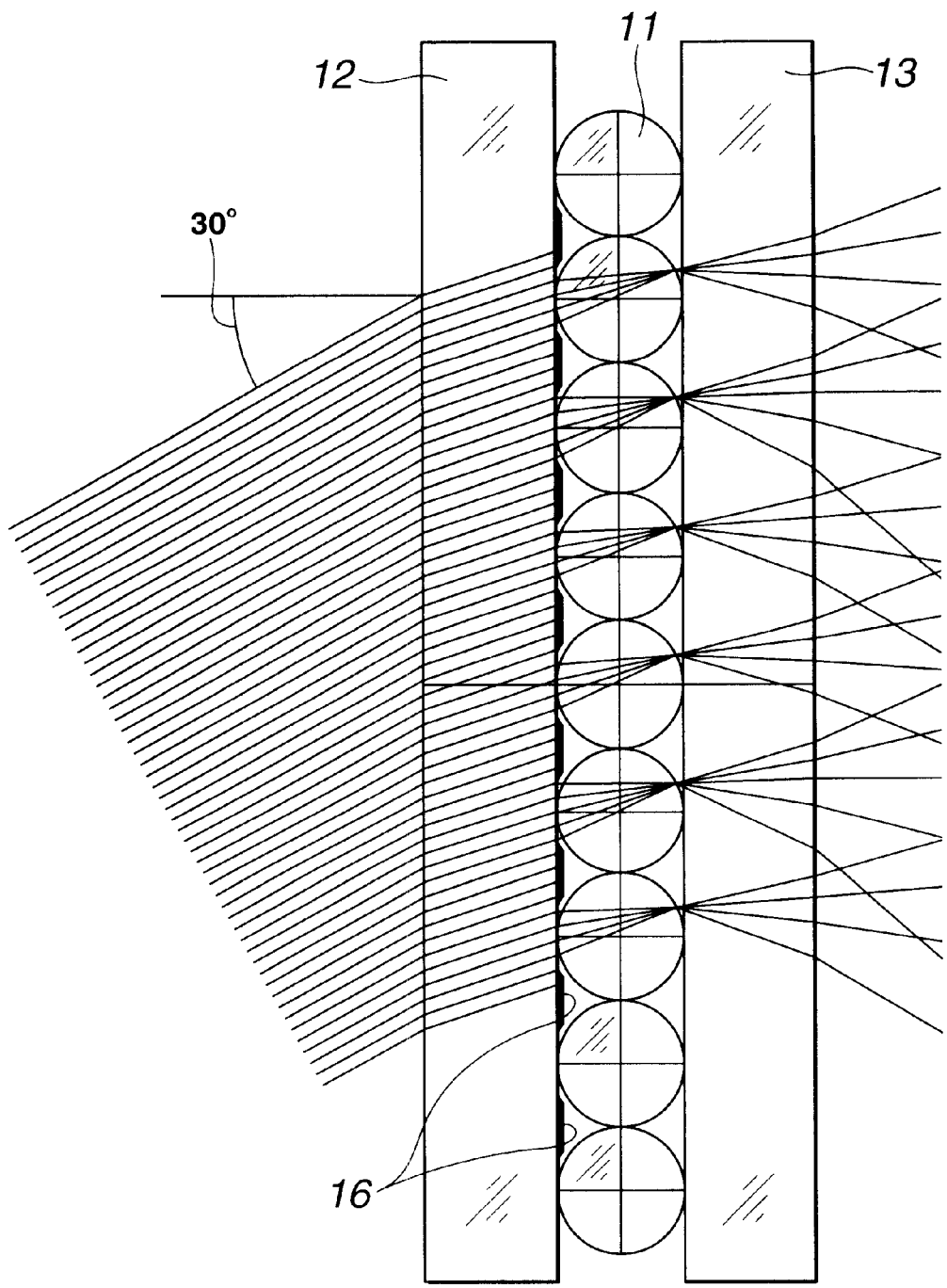
FIG. 11 is a diagram depicting the state of emitting lights when the luminous flux at incident angle θ=30 enters the spherical lenses which refractive index is n=1.84 in the first embodiment.

And FIG. 11 is a diagram depicting the state of emitting lights when luminous flux at incident angle $\theta=30$ enters the spherical lenses which refractive index is n=1.84.

When the incident angle is $\theta=30$ as well, luminous flux which diffuses with a direction approximately vertical to the main surface of the translucent screen is emitted, although the luminous flux diffuses slightly wider.

Because of the effect of the diffusion surface 13a of the diffusion plate 13 described above, images do not look discontinuous at the seams of the projection ranges by the projectors, even if the translucent screen is observed from a diagonal direction.

According to the first embodiment described above, spherical lenses having a predetermined refractive index are used and the entrance aperture is defined by the shielding means which is disposed not only at the emission side of the spherical lenses arranged two-dimensionally, but also at the incidence side, so that the luminous flux with a central light approximately vertical to the main surface of the translucent screen can be obtained, therefore, images do not look discontinuous at the seams of the projection ranges by the projectors, even if the screen is observed from a diagonal direction, and smooth and continuous images can be observed.

Also the refractive index alone can be adjusted without depending on the size of the spherical lenses, so any size of spherical lens in a range smaller than the size of the projected pixels can be used according to the design requirement, which increases flexibility in design.

The luminous flux with a central light approximately vertical to the main surface of the translucent screen can be obtained regardless the incident angle of the luminous flux, so general purpose translucent screens can be obtained without depending on the arrangement of projectors, LCDs and the projection optical system.

The shield also created at the emission side can function as a black matrix, therefore high contrast images can be obtained and easily seen.

Figure 12:
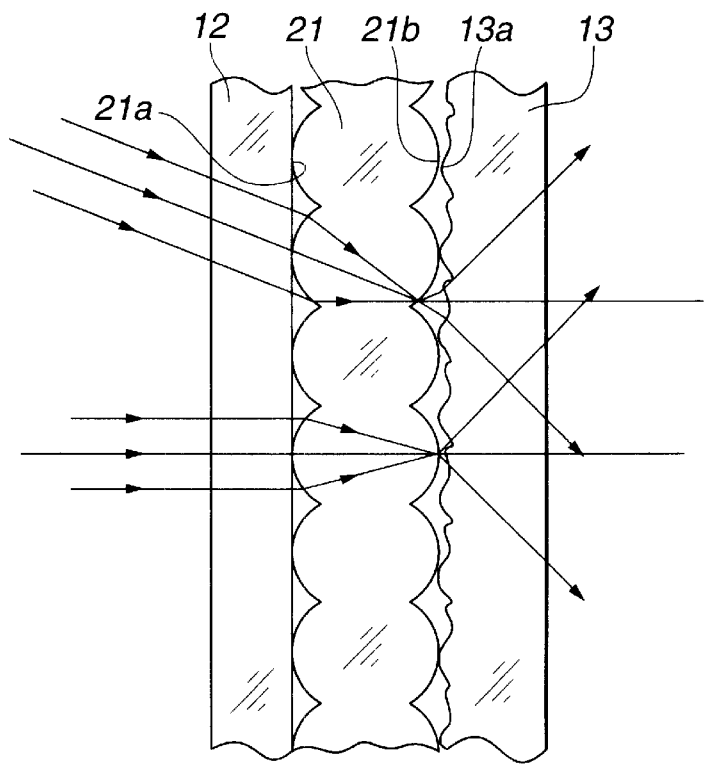
FIG. 12 is a cross-sectional view depicting the configuration of the translucent screen according to the second embodiment of the present invention.
Figure 13:
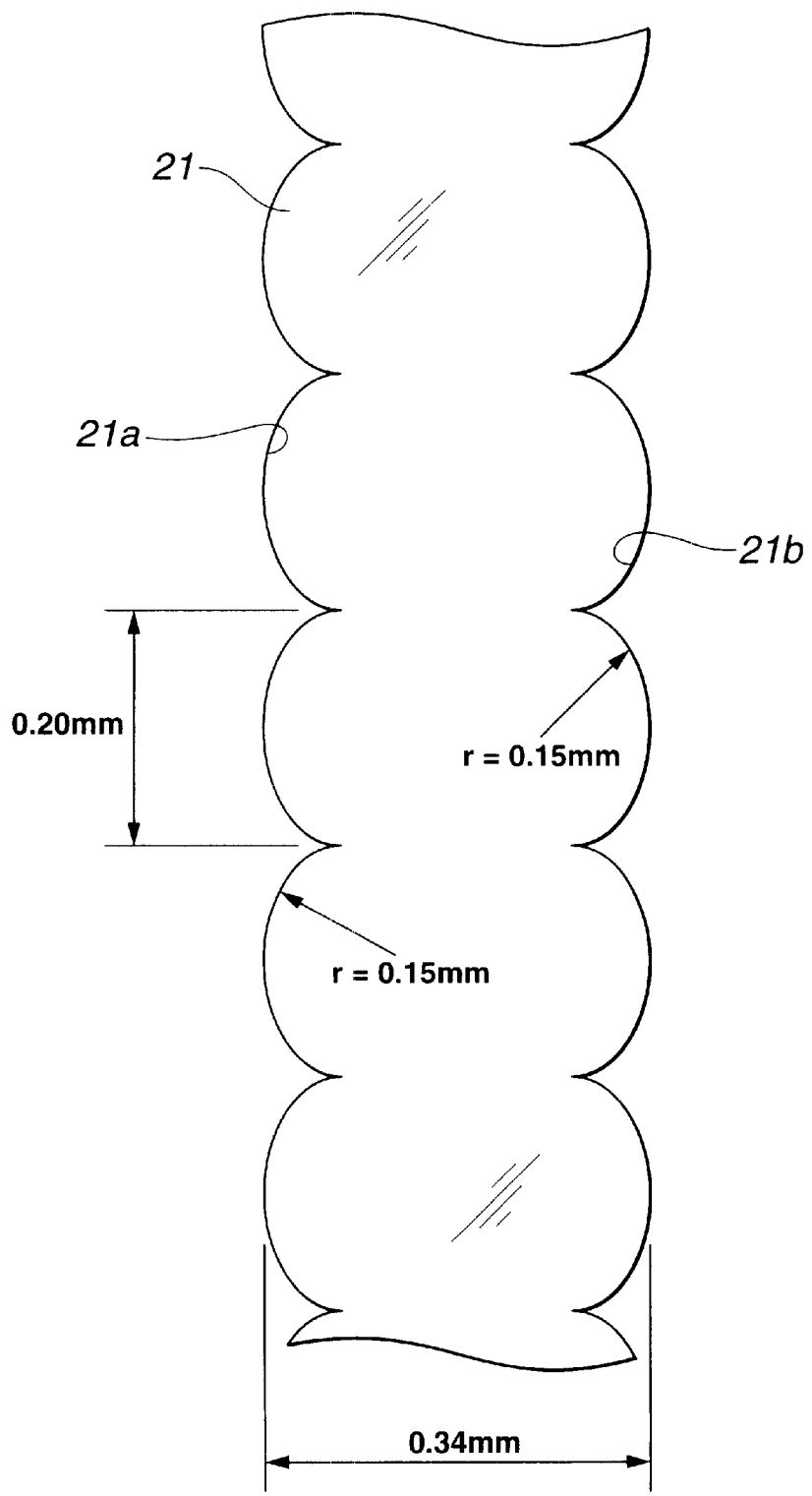
FIG. 13 is a diagram depicting a specific configuration example of the lens array of the second embodiment.

FIG. 12 and FIG. 13 show the second embodiment of the present invention, where FIG. 12 is a cross-sectional view depicting the configuration of the translucent screen. In the second embodiment, descriptions on parts the same as the first embodiment are omitted, and here only the major parts which are different will be described.

In this translucent screen, a lens array 21, where the above mentioned spherical lenses of the first embodiment are arranged at a cycle shorter than the diameter of the sphere, is sandwiched by the above mentioned supporting material 12 and the diffusion plate 13.

In other words, this lens array 21 is created by integrated molding for example, so that the spherical lenses are connected with some portions overlapping with each other, and comprises a first convex lens surface 21a which is a condensing optical surface constituting the first surface made of spherical lens surfaces, and a second convex lens surface 21b which is the second surface made of the spherical lens surfaces and is identically centered with the first convex lens surface.

In the lens array 21, the shielding means need not be disposed separately, since the entrance aperture is defined by overlapping spherical lenses, and the integrated molding makes it unnecessary to use separate means to secure the respective positions of the lenses.

FIG. 13 is a diagram depicting a specific configuration example of the lens array 21.

The lens array 21 is created by an optical medium which refractive index is 1.5 for example, and FIG. 13 shows the optimum state when the lens pitch is 0.2 mm.

In other words, the curvature of the lens on the spherical lens surfaces constituting the first convex lens surface 21a, and the curvature of the lens of the spherical lens surfaces constituting the second convex lens surface 21b are both r=0.15 mm and the thickness of the lens array is 0.34 mm, where these values are in proportion to the above mentioned lens pitch.

If the lens pitch is still 0.2 mm and the lens array 21 is created using an optical medium which refractive index is 1.34, the optimum state is when the curvature of the lens is r=0.14 mm and the thickness is 0.46 mm.

When the configuration of the lens array 21 is observed from a normal line vertical to the main surface of the translucent screen, each convex lens surface looks like a regular hexagon in the case of the arrangement shown in FIG. 7A, and looks square in the case of the arrangement shown in FIG. 7B.

According to the second embodiment, an effect almost the same as the first embodiment can be obtained, and the number of manufacturing steps can be decreased in order to reduce manufacturing cost, since the shielding means need not be disposed separately. Also, the luminous flux projected from the projectors is transmitted without being shielded, so the quantity of the lights is not decreased, and images with high brightness can be obtained.

Figure 14:
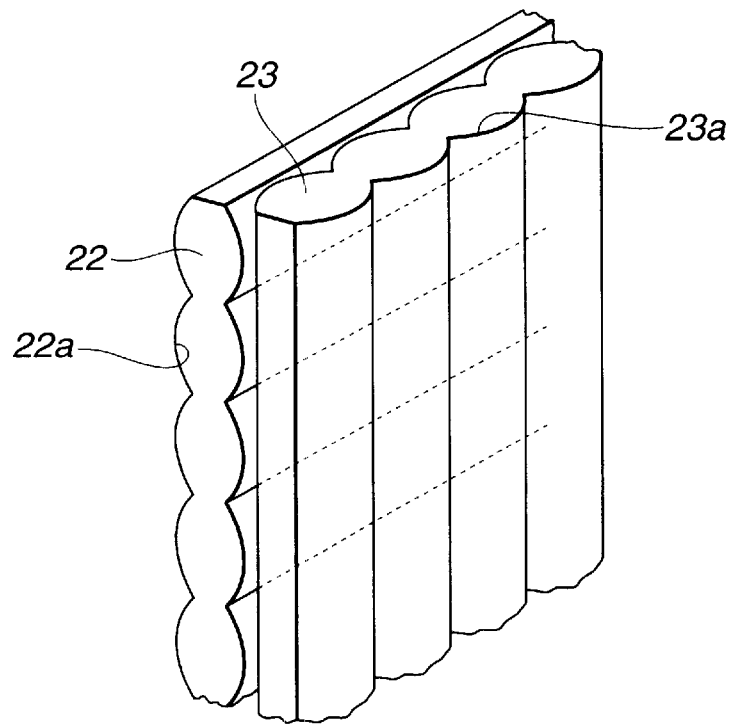
FIG. 14 is a perspective view depicting the lens array of a variant form of the second embodiment.

FIG. 14 is a perspective view depicting a configuration of the lens array according to a variant form of the second embodiment.

In the lens array of this variant form, a one-dimensional lens array 23 in the vertical direction (y direction) and a one-dimensional lens array 22 in the horizontal direction (x direction) are overlaid in the transmitting direction of the luminous flux, so that a function almost the same as the lens array 21 of the second embodiment can be implemented.

In other words, in the one-dimensional lens arrays 22 and 23, a plurality of convex lens surfaces which are a part of the surface of the cylinder surface are arranged, and a one-dimensional lens array, a convex lens surface 22a on one side of the one-dimensional lens array 22 for example, is a condensing optical surface constituting the first surface, and a convex lens surface 23a on the other side of the one-dimensional lens array 23 for example, is a condensing optical surface constituting the second surface.

In such a configuration, the diffusion angle in the vertical direction and the diffusion angle in the horizontal direction may be changed by changing the lens shape of the one-dimensional lens array in the vertical direction and the lens shape of the one-dimensional lens array in the horizontal direction.

According to such a variant form of the second embodiment, effects almost the same as the second embodiment can be implemented, and the diffusion angle can be changed according to direction.

Figure 15:
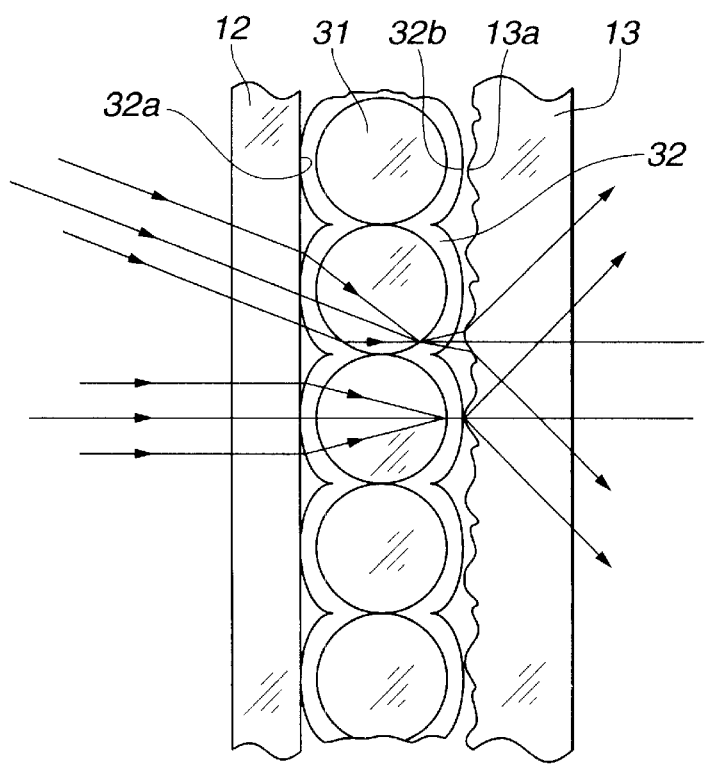
FIG. 15 is a cross-sectional view depicting the configuration of the translucent screen according to the third embodiment of the present invention.

FIG. 15 shows the third embodiment of the present invention, and is a cross-sectional view depicting a configuration of the translucent screen. In the third embodiment, descriptions on parts the same as the first and second embodiments are omitted, here only the major parts which are different will be described.

In this translucent screen, the above mentioned spherical lenses of the first embodiment are inter-connected by coating with transparent resin so as to implement a configuration similar to the lens array 21 of the second embodiment.

The spherical lenses 31 arranged as shown in FIG. 7A or FIG. 7B are inter-connected to be integrated by coating with a transparent resin layer 32 having a refractive index almost the same as the optical medium constituting the spherical lenses 31.

The integrated spherical lenses 31 and the transparent resin layer 32 integrated in this way has a similar function as the above mentioned lens array 21, where the surface of the transparent resin layer 32, created at the incident side of the spherical lenses 31, becomes the first convex lens surface 32a which is a condensing optical surface constituting the first surface, and the surface of the transparent resin layer 32, created at the emission side, becomes the second convex lens surface 32b constituting the second surface. These convex lenses 32a and 32b become the spherical lens surfaces, just like the case of the second embodiment.

The translucent screen is configured by sandwiching the integrated spherical lenses 31 and the transparent resin layer 32 by the supporting material 12 and the diffusion plate 13.

According to the third embodiment, the plurality of spherical lenses are integrated with the transparent resin layer, so that an effect almost the same as the first and second embodiments can be implemented.

Figure 16:
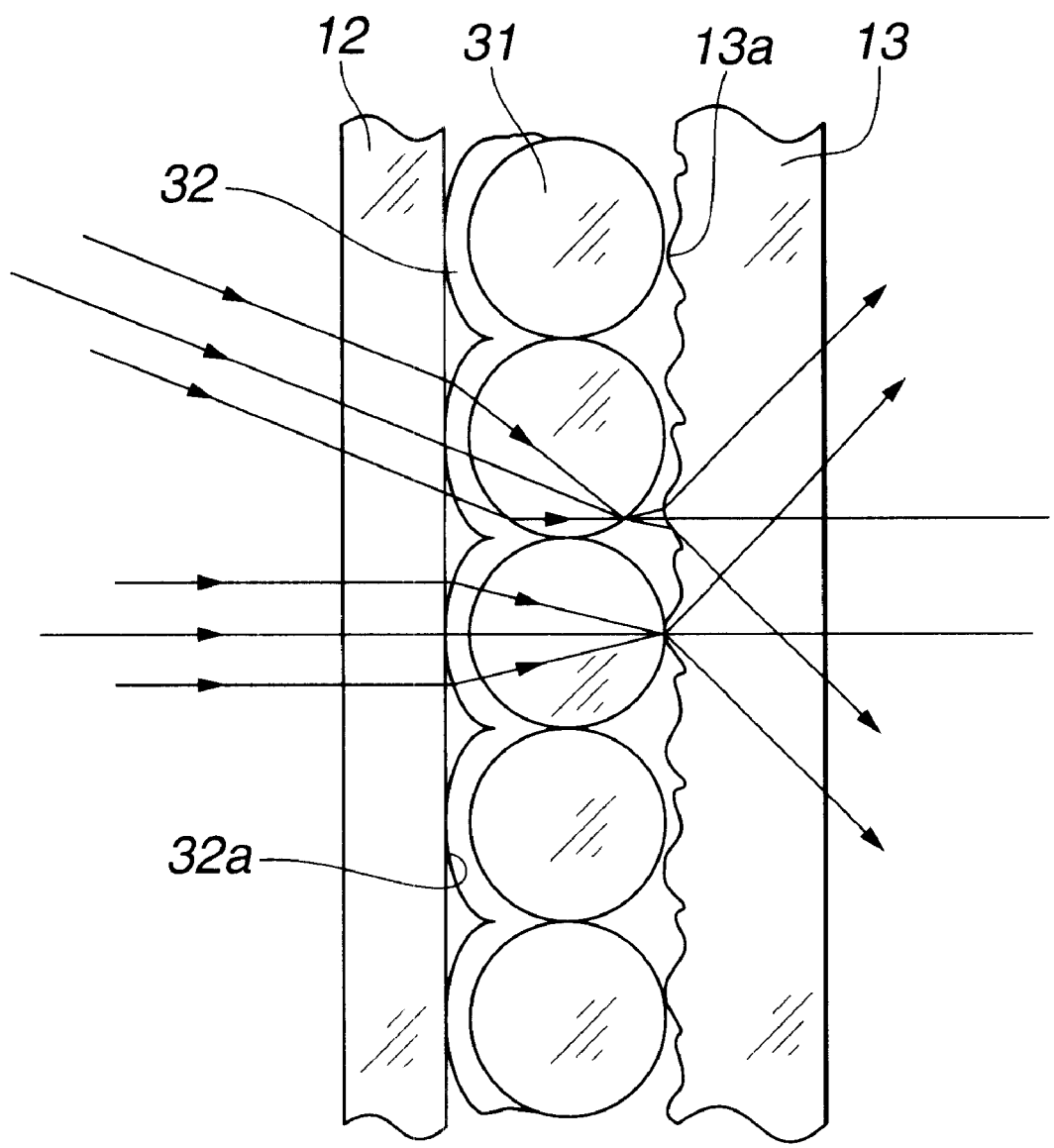
FIG. 16 is a cross-sectional view depicting the configuration of the translucent screen of a variant form of the third embodiment.
Figure 17:
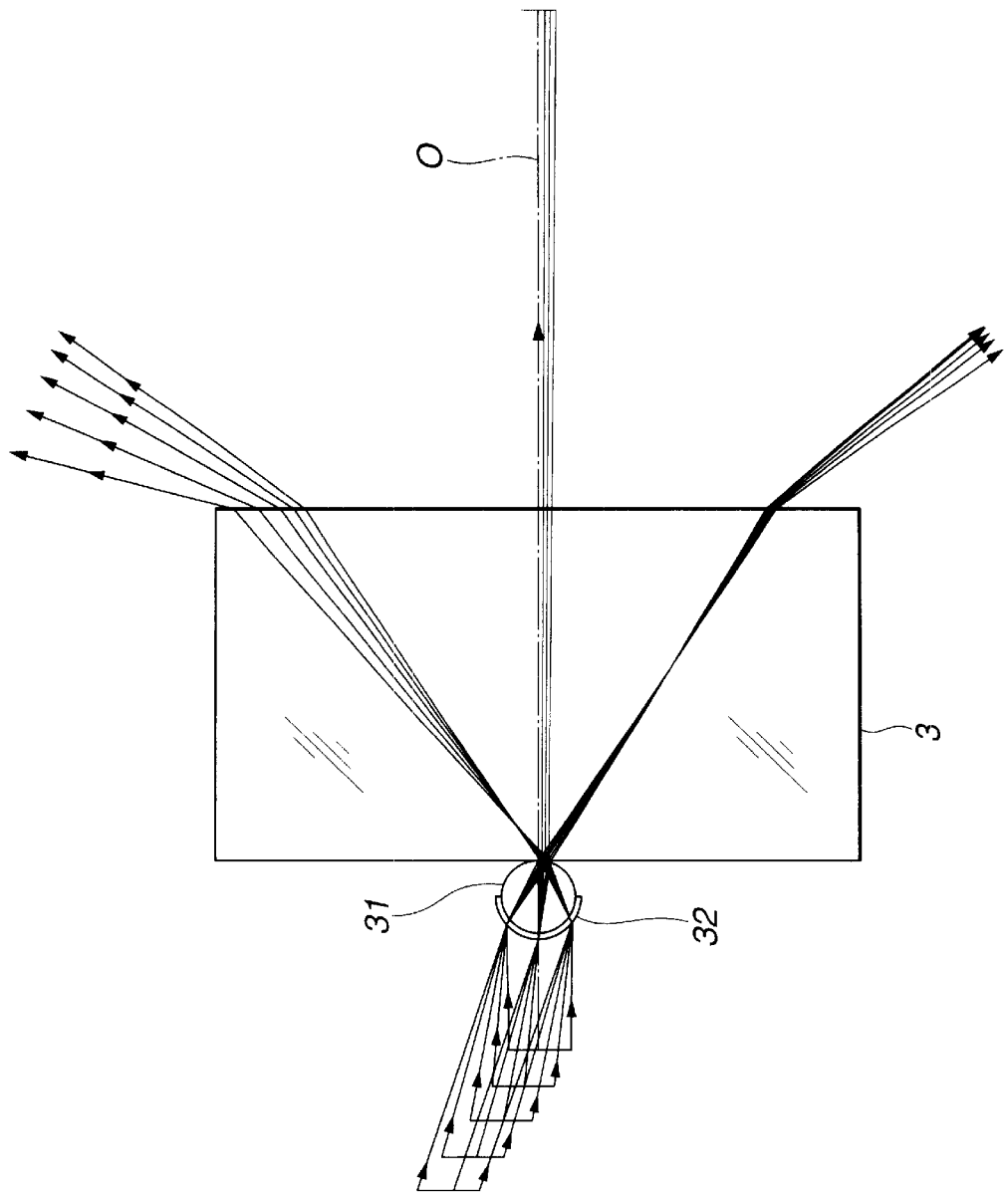
FIG. 17 is a diagram depicting the state of the emitting light in the configuration in FIG. 16.

FIG. 16 is a cross-sectional view depicting a configuration of the translucent screen of a variant form of the third embodiment, and FIG. 17 is a diagram depicting the state of emitting light in the configuration in FIG. 16.

The translucent screen of the variant form has a configuration almost the same as the translucent screen shown in FIG. 15, but the difference is that the transparent resin layer 32 is disposed only on the surface at the incident side.

The state of the emitting light in this configuration is as shown in FIG. 17, where the central light of the diffusion lights to be emitted is approximately in parallel with the optical axis O, even when the incident light enters diagonally.

In the case of the example shown in FIG. 17, the spherical lens 31 is configured to have a diameter of 100 μm, using an optical medium with a refractive index of 1.84, and the transparent resin layer 32 is coated only on the surface at the incident side using an optical medium with a refractive index of 1.5, such that the layer thickness becomes 5 μm.

The optimum layer thickness of the transparent resin layer 32 is determined by the diameter of the spherical lens 31, where the layer thickness and the diameter are in proportion, for example, if the diameter of the spherical lens 31 is 100 μm, the optimum layer thickness is 5 μm, and if the diameter of the spherical lens 31 is 50 μm, the optimum layer thickness is 2.5 μm.

By such a variant form of the third embodiment as well, effects almost the same as the third embodiment can be implemented.

Figure 18:
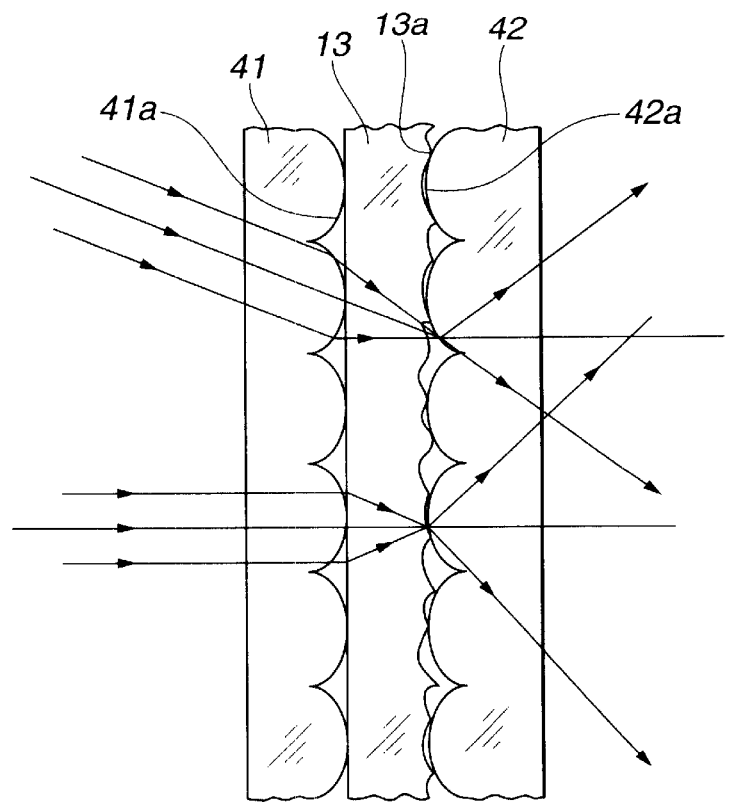
FIG. 18 is a cross-sectional view depicting the configuration of the translucent screen according to the fourth embodiment of the present invention.

FIG. 18 shows the fourth embodiment of the present invention, and is a cross-sectional view depicting a configuration of the translucent screen. In this fourth embodiment, descriptions on parts the same as the first to third embodiments are omitted, here only the major parts which are different will be described.

This translucent screen comprises a lens array 41 where the first convex lens surface 41, which is a condensing optical surface comprised of a plurality of spherical lens faces, is created at the emission side in an approximate flat shape, a diffusion plate 13 which is disposed at the emission side of the lens array 41 where the emission side surface is the diffusion surface 13a, and a lens array 42 where the second convex lens surface 42a comprised of a plurality of spherical lens surfaces is created at the incident side, which is the side facing the diffusion surface 13a of the diffusion plate 13.

The thickness of the diffusion plate 13 is set such that the diffusion surface 13a and the convex lens surface 42a of the lens array 42 are disposed near the focal position of the first convex lens surface 41a of the lens array 41. In other words, the diffusion plate 13 has a function to diffuse lights, and has the function of a spacer to maintain a constant optical path length between the lens array 41 and the lens array 42.

According to the fourth embodiment, effects almost the same as the first to third embodiments can be implemented, and the thickness of the lens array can be changed arbitrarily, so strength required for a large translucent screen can be easily supported.

Figure 19:
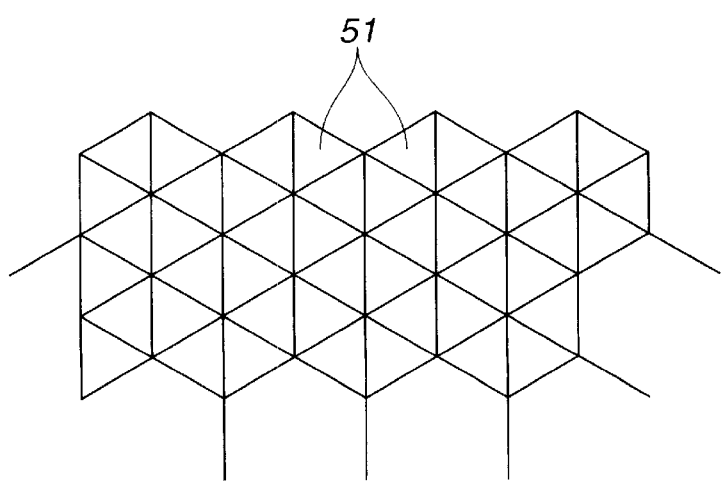
FIG. 19 is a plan view depicting the configuration of the lens array of the translucent screen according to the fifth embodiment of the present invention.
Figure 21:
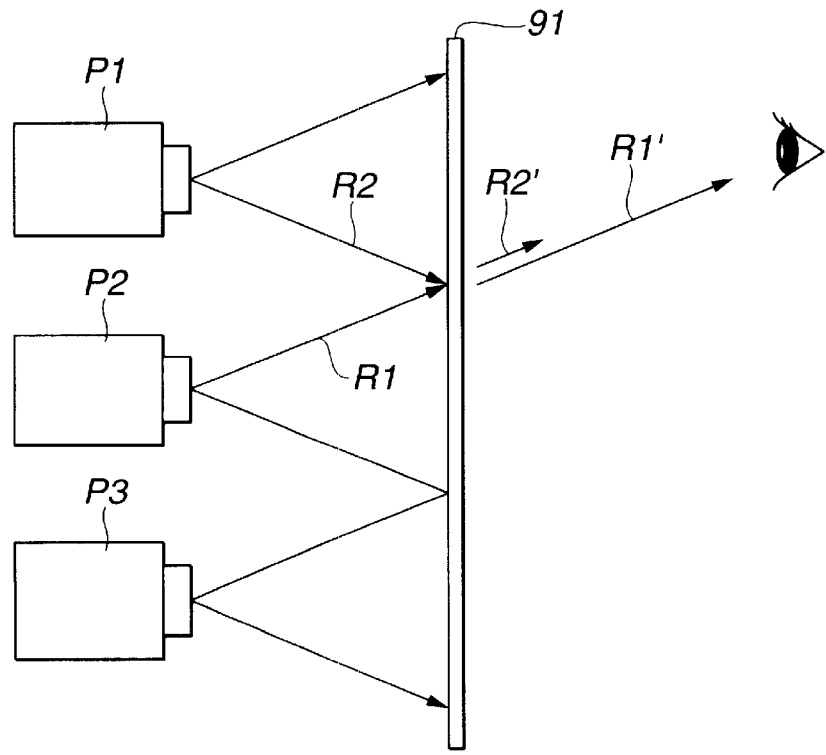
FIG. 21 is a diagram depicting the state when the quantity of light which transmits the connecting sections in a diagonal direction is different when lights are projected from a plurality of projectors onto the translucent screen of the related art.

FIG. 19 shows the fifth embodiment of the present invention, and is a plan view depicting a configuration of the lens array of the translucent screen. In the fifth embodiment, descriptions on parts the same as the first to fourth embodiments are omitted, here only the major parts which are different will be described.

In this lens array 51, the convex lens surfaces 21a and 21b of the lens array 21 of the second embodiment are comprised of polyhedrons. In other words, the surface at the incident side is comprised of a regular hexagonal pyramid surface, the surface at the emission side is also comprised of a regular hexagonal pyramid surface, and these are continuously arranged cyclically.

Here regular hexagonal pyramid surfaces are used, but the surfaces may be quadrangular pyramid surfaces, and also are not limited to pyramid surfaces. In other words, a part of a polyhedron having an asymptotic shape of a spherical lens surface can be applied.

According to the fifth embodiment, effects almost the same as the first to fourth embodiments can be implemented, and molding is easier than a spherical surface since the surface is a polygon.

Figure 20:
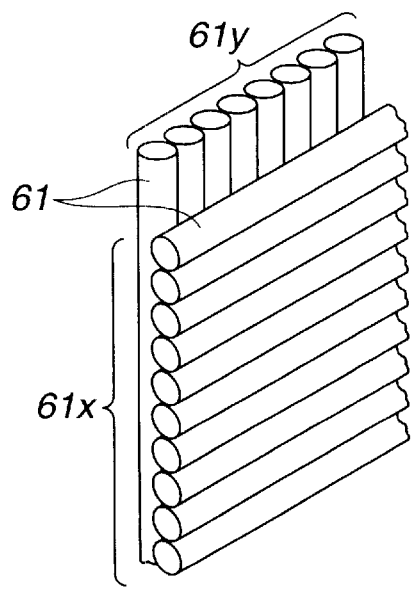
FIG. 20 is a perspective view depicting the state when the lens array of the translucent screen of the sixth embodiment of the present invention is comprised of fibers.

FIG. 20 shows the sixth embodiment, and is a perspective view depicting the state when the lens array of the translucent screen is comprised of fibers. In this sixth embodiment, descriptions on parts the same as the first to fifth embodiments are omitted, here only the major parts which are different will be described.

In the lens array of this embodiment, a fiber group 61x, where a plurality of fibers 61 which have a circular cross-section are arranged horizontally, and a fiber group 61y, where a plurality of fibers are arranged vertically so as to be perpendicular to the fibers of the fiber group 61x, are overlaid in the luminous flux transmitting direction.

The optical characteristic of the lens array configured in this way is the same as the one shown in FIG. 14, and an optical characteristic equivalent to the case of spherical lenses can be obtained.

Just like the above mentioned respective embodiments, a shield is created or a transparent resin layer is created on the surface in such a configuration.

According to the sixth embodiment, effects almost the same as the first to fifth embodiments can be implemented, and unlike the case of using spherical lenses, it is difficult to make spherical diameters uniform at high accuracy, and spherical lenses with different spherical diameters may mix in and generate gaps, so using fibers as in this embodiment causes no such problems, and accuracy can be uniform at a relatively low cost.

In the case of the above mentioned respective embodiments, absorbent light may be mixed into the diffusion plate, spherical lenses and lens arrays to prevent a drop in the contrast of images by the reflection of extraneous light.

In this invention, it is apparent that working modes which are different in a wide range can be formed on the basis of this invention without departing from the spirit and scope of the invention. This invention is not restricted by any specific embodiment except for the limits of the appended claims.

What is claimed is:

1. A translucent screen used for a projector system which creates a multi-screen by projecting respective images from a plurality of arranged projectors, comprising:

a first surface where a plurality of condensing optical surfaces for condensing entering luminous flux are arranged at a predetermined cycle; and a second surface where a plurality of optical surfaces for deflecting the optical paths of lights entering approximately the center of the condensing optical surfaces arranged on said first surface in a direction approximately vertical to the main surface of the translucent screen are arranged at a predetermined cycle, wherein said first surface and second surface are set such that when the same images are projected from two adjacent projectors out of said plurality of projectors, the beams from said two adjacent projectors emitted from said second surface are set such that the brightness is approximately the same regardless the direction of observing said translucent screen, and that the images constituting the multi-screen continue smoothly, wherein said second surface is disposed approximately at the focal positions of the condensing optical surfaces arranged on said first surface, wherein the condensing optical surfaces arranged on said first surface are convex lens surfaces, and said second surface is comprised of the plurality of convex lens surfaces corresponding to the convex lens surfaces of said first surface respectively, which are arranged two-dimensionally approximately at the focal positions of the convex lens surfaces of said first surface, wherein the condensing optical surfaces comprised of the convex lenses on said first surface are comprised of spherical surfaces having a predetermined entrance aperture, and wherein said first surface defines the condensing optical surfaces to be the actual entrance aperture by continuously and cyclically arranging the condensing optical surfaces, which are a part of the spherical surfaces, at a space shorter than the diameter of the spherical surface so as to define said condensing optical surface to be a predetermined entrance aperture.

2. The translucent screen according to claim 1, further comprising, shielding means for defining the entrance aperture of the condensing optical surfaces of said first surface by shielding a part of the entering luminous flux.

3. The translucent screen according to claim 1, wherein the condensing optical surfaces of said first surface is comprised of an optical medium which has refractive index of 1.3 to 4.0.

4. The translucent screen according to claim 1, further comprising a diffusion plate, which has a diffusion surface disposed near said second surface.

5. A translucent screen used for a projector system which creates a multi-screen by projecting respective images from a plurality of arranged projectors, comprising:

a first surface where a plurality of condensing optical surfaces for condensing entering luminous flux are arranged at a predetermined cycle; and a second surface where a plurality of optical surfaces for deflecting the optical paths of lights entering approximately the center of the condensing optical surfaces arranged on said first surface in a direction approximately vertical to the main surface of the translucent screen are arranged at a predetermined cycle, wherein said first surface and second surface are set such that when the same images are projected from two adjacent projectors out of said plurality of projectors, the beams from said two adjacent projectors emitted from said second surface are set such that the brightness is approximately the same regardless the direction of observing said translucent screen, and that the images constituting the multi-screen continue smoothly, wherein the condensing optical surfaces arranged on said first surface are convex lens surfaces, and said second surface is comprised of the plurality of convex lens surfaces corresponding to the convex lens surfaces of said first surface respectively, which are arranged two-dimensionally approximately at the focal positions of the convex lens surfaces of said first surface, wherein the condensing optical surfaces comprised of the convex lenses on said first surface are comprised of spherical surfaces having a predetermined entrance aperture, and wherein said first surface defines the condensing optical surfaces to be the actual entrance aperture by continuously and cyclically arranging the condensing optical surfaces, which are a part of the spherical surfaces, at a space shorter than the diameter of the spherical surface so as to define said condensing optical surface to be a predetermined entrance aperture.

6. The translucent screen according to claim 5, further comprising a diffusion plate, which has a diffusion surface disposed near said second surface.

* * * * *